Nov. 1, 1966  J. J. LAIDIG  3,282,446
UNLOADING MECHANISM FOR SILOS
Filed Oct. 13, 1964
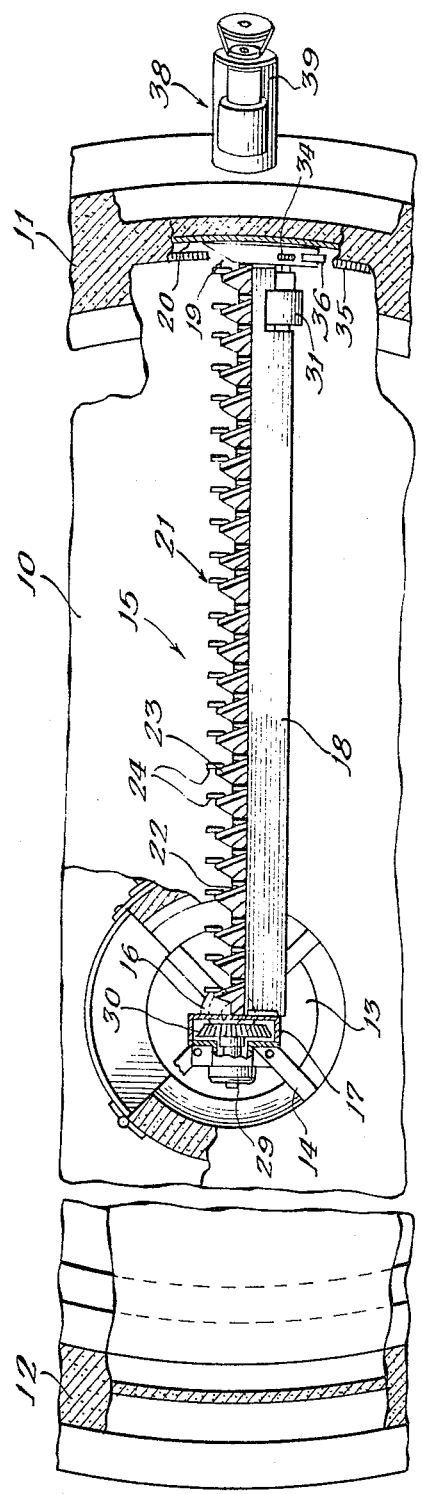
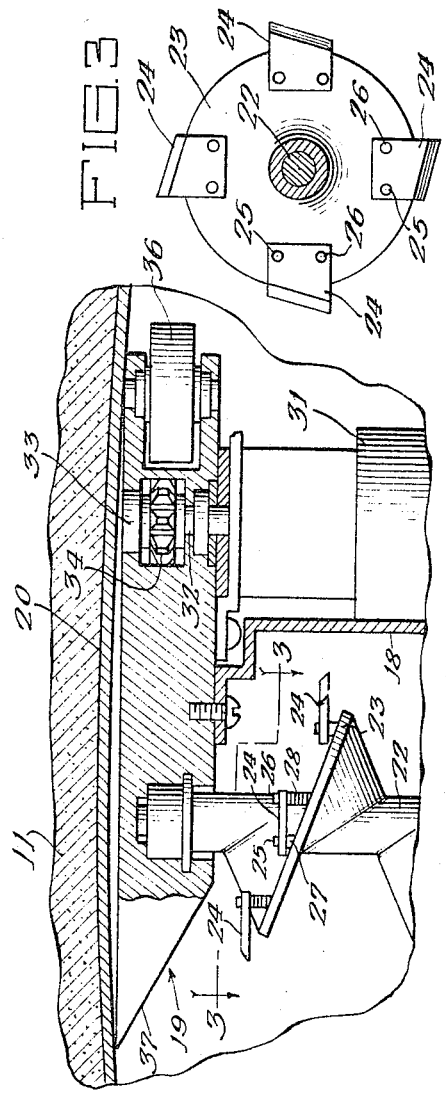
Inventor:
Jonathan J. Laidig
By: Hofgren, Wegner, Allen,
Stellman & McCord
Attorneys United States Patent Office 3,282,446
Patented Nov. 1, 1966

3,282,446
UNLOADING MECHANISM FOR SILOS
Jonathan J. Laidig, Mishawaka, Ind., assignor to Laidig Silo Unloaders, Inc., a corporation of Delaware
Filed Oct. 13, 1964, Ser. No. 403,558
5 Claims. (Cl. 214—17)

This application relates to unloading mechanism for silos, and in particular it relates to such a mechanism which removes material from the bottom of the mass of material stored in the silo.

Laidig Patent No. 3,121,501, issued February 18, 1964, discloses and claims a silo unloading mechanism upon which the present mechanism is an improvement.

In accordance with the disclosure of Patent 3,121,501, a silo floor is provided with a central opening, and a radially disposed sweep arm is mounted for rotation about the axis of the silo. The sweep arm is provided with conveyor means in the form of an auger for moving silage radially inwardly toward the central opening where it may drop through to a discharge conveyor which carries it to the outside of the silo. The auger is provided with cutting blades which are mounted to project outwardly from the periphery of the helical auger flight, so that the knives may cut into the silage forward of and above the conveyor and thus loosen the silage for movement by the conveyor to the central opening. One motor is provided for driving the conveyor with its associated cutting knives, while a second motor mounted at the outer end of the sweep arm near the silo wall affords motive power for rotating the sweep arm around the silo.

In the structure of the Laidig patent the knives are mounted flat upon the helical flight so that when viewed in plan they are along a plane which is diagonal to the silo wall and inclined with respect to a plane normal to the auger shaft. Thus, the blades tend not only to cut into the silage but also to force cut off segments radially in the direction of the axial opening in the floor of the silo; and prior to the present invention it was thought that some such disposition of the cutting knives in a silo unloader of the present type was essential so that the knives could both cut grooves in the silage and tend to break it free of the mass of stored material for handling by the helical conveyor. However, the radial thrust of the knives accounts for much of the power required to run the conveyor-cutter, and also has been found to produce much undesirable chaff by a grinding action on the silage.

In accordance with the present invention the cutting knives on the auger flight are mounted at such an angle with respect to the helix that each knife occupies a plane which is substantially tangent to an imaginary cylinder that is concentric with the silo wall, and is normal to the auger shaft. Thus, each blade merely cuts an annular groove in the silage which is about the same width as the thickness of the blade and places no appreciable radial force component upon the silage at the side of the groove. This substantially reduces the power required for driving the conveyor and cutter device, and forms almost no chaff. At the same time, the concentric annular grooves that are cut in the silage so weaken the base of the mass of material in the silo that some of it falls to the floor for conveying by the auger even without the radial pressure that is applied by the diagonally disposed blades disclosed in Patent 3,121,501.

The structure herein disclosed is capable of loosening silage for removal at about the same speed as the structure of the patent, but because much less power is required for the cutting operation there is more power available for moving the loose silage into the axial opening in the floor of the silo. As a result the present structure is considerably more efficient in its over all operation than is the structure of Patent No. 3,121,501.

The mechanism is illustrated in a preferred embodiment in the accompanying drawings in which:

FIG. 1 is a fragmentary horizontal sectional view through a silo which is equipped with the improved mechanism of the present invention, parts of said drawing being broken away for clarity of illustration.

FIG. 2 is a fragmentary section on an enlarged scale at the outer extremity of the sweep arm, showing the auger and knives in plan view; and FIG. 3 is a section taken substantially as indicated along the line 3—3 of FIG. 2.

Referring to the drawings in greater detail, a silo has a floor 10 the periphery of which is supported on a cylindrical foundation wall 11 from which a cylindrical silo wall 12 extends upwardly. An axial opening 13 in the floor of the silo is provided with a spider 14 upon which a sweep arm, indicated generally at 15, is mounted for rotation by means of a bearing head 16.

Surmounting the bearing head 16 is a housing 17 to which the inner end of an arcuate shield 18 is secured. The outer end of the shield 18 is secured to a drive plow, indicated generally at 19, which is illustrated as riding in a channel member 20 which is recessed in the silo wall 12, but which may, if desired, be positioned wholly inside the silo wall so as to ride on the floor 10. A helical auger conveyor, indicated generally at 21, includes a shaft 22 which has its inner and outer ends journaled, respectively, in the housing 17 and the drive plow 19, and a helical auger flight 23 on the shaft has a front face 23a and a rear face 23b and is provided with peripherally mounted knives 24 that afford cutting means. As best seen in FIG. 2, each of the knives 24 is mounted upon the rear face 23b of auger flight 23 by means of a short stud 25 and a long stud 26 carrying spacer sleeves 27 and 28, respectively, there being retaining nuts screwed onto the projecting outer ends of the studs to clamp the knives 24 against the spacers. The spacers are so related that each knife is substantially tangent to an imaginary cylinder that is concentric with the cylindrical silo wall 12, and each knife is also in a plane normal to the auger shaft 22.

Drive means for the conveyor 21 includes a first electric motor 29 that is supported on the spider 14 and is drivingly connected with the auger shaft 22 by gear means 30 part of which is journaled in the bearing head 16 and part of which is in the housing 17.

The sweep arm 15 has a motor 31 near its outer end that has an output shaft 32 journaled in a bearing 33 in the drive plow 19, and a pinion 34 in the form of a sprocket makes positive driving engagement with a rack 35 which takes the form of a roller chain fixedly mounted in the upper web of the channel member 20. A supporting wheel 36 is journaled in the rear of the drive plow to support the plow, and the front end of the plow is provided with a surface 37 which is diagonal to the wall 12 so as to move silage inwardly toward the sweep auger 21. The motor 29 and gears 30 provide first drive means for driving the conveyor auger 21 with its associated cutting blades 24, while the motor 31 and sprocket 34 provide second drive means for rotating the sweep arm 15 about the silo.

Silage moved to the central opening 13 by the auger conveyor 21 drops into the inner end (not shown) of separate discharge auger means, indicated generally at 38, the outer end 39 of which extends through the silo foundation 11 so as to discharge material outside the silo. Conveniently the conveyor 38 is also a helical type conveyor.

As the sweep arm is rotated about the silo and the conveyor auger is driven, the cutting means afforded by the knives 24 cuts concentric annular grooves in the silage forward of and above the helix, and because of the heretofore described mounting of the knives 24 they exert substantially no radial pressure upon the silage as they cut the grooves in it.

The foregoing detailed description is given for clearness of understanding only and no unnecessary limitations should be understood therefrom, as modifications will be obvious to those skilled in the art.

I claim:

1. In a silo having a floor with an axial opening and having an upright cylindrical wall, unloader means comprising: a radial sweep arm adjacent the floor; means mounting said arm for rotation about the axis of the silo; drive means for rotating the arm; a driven auger conveyor on said arm for moving silage toward the axial opening, said conveyor having a shaft and a helical flight on the shaft; and cutting means comprising a plurality of blades which are mounted on the periphery of the flight and extend radially beyond the margin of the flight, said blades being substantially tangent to imaginary cylinders that are substantially concentric with the silo wall, whereby as the sweep arm is rotated the blades may cut grooves in the silage without exerting any substantial component of force radially of the silo.

2. The unloader means of claim 1 in which the auger shaft is substantially parallel to the floor, and the knives are in planes normal to the shaft.

3. The unloader means of claim 1 which includes blade mounting means for each blade comprising studs secured to the helical flight and having their free ends in a single plane, spacers on said studs abutting the helical flights and having their outer ends in a single plane, and means securing the blade to the studs in contact with the spacers.

4. In a silo having a floor with an axial opening and having an upright cylindrical wall, unloader means comprising: a radial sweep arm adjacent the floor; means mounting said arm for rotation about the axis of the silo; drive means for rotating the arm; a driven auger conveyor on said arm for moving silage toward the axial opening, said conveyor having a shaft and a helical flight on the shaft which has a forward face toward the axial opening and a rear face; and cutting means mounted on the conveyor comprising a plurality of blades all of which are positioned close adjacent the rear face of the helical flight, and project radially beyond the margin of the flight, said blades being substantially tangent to imaginary cylinders that are substantially concentric with the silo wall, whereby as the sweep arm is rotated the blades may cut grooves in the silage without exerting any substantial component of force radially of the silo.

5. The unloader means of claim 4 which includes means mounting each blade on the helical flight, said mounting means comprising studs secured to the helical flight and having their free ends in a single plane, spacers on said studs abutting the helical flights and having their outer ends in a single plane and means securing the blade to the studs in contact with the spacers.

References Cited by the Examiner

UNITED STATES PATENTS

| | | | |
|---|---|---|---|
| 2,497,295 | 2/1950 | Cavallier | 198—213 |
| 3,121,501 | 2/1964 | Laidig | 214—17 |

GERALD M. FORLENZA, *Primary Examiner.*

ROBERT G. SHERIDAN, *Examiner.*